(12) United States Patent
Kwon

(10) Patent No.: US 6,934,371 B2
(45) Date of Patent: Aug. 23, 2005

(54) POWER CONTROL APPARATUS OF PUBLIC TELECOMMUNICATION TERMINAL

(76) Inventor: Hwang-Sub Kwon, 108-404 Samsung Apt. 1014-3(36-3) Daechi-dong, Kangnam-gu, Seoul (KR)

(\*) Notice: Subject to any disclaimer, the term of this patent is extended or adjusted under 35 U.S.C. 154(b) by 540 days.

(21) Appl. No.: 10/218,060

(22) Filed: Aug. 13, 2002

(65) Prior Publication Data

US 2003/0040295 A1 Feb. 27, 2003

(30) Foreign Application Priority Data

Aug. 21, 2001 (KR) .......................................... 2001-50195

(51) Int. Cl.$^7$ ............................................. H04M 11/00
(52) U.S. Cl. ............................. 379/102.04; 379/102.01
(58) Field of Search .................... 379/102.01–102.06, 379/100.01–100.17

(56) References Cited

U.S. PATENT DOCUMENTS

| | | | | |
|---|---|---|---|---|
| 4,593,323 A | * | 6/1986 | Kanda et al. | 379/100.01 |
| 4,723,269 A | * | 2/1988 | Summerlin | 379/102.04 |
| 4,837,813 A | * | 6/1989 | Terajima | 379/100.04 |
| 5,812,643 A | * | 9/1998 | Schelberg et al. | 379/93.12 |
| 6,307,463 B1 | * | 10/2001 | Chou | 379/102.03 |
| 6,721,400 B2 | * | 4/2004 | Schelberg et al. | 379/93.12 |

* cited by examiner

*Primary Examiner*—Wing Chan
(74) *Attorney, Agent, or Firm*—Dann, Dorfman, Herrell and Skillman, P.C.

(57) ABSTRACT

Disclosed is a power control apparatus of a public telecommunication terminal which makes the public telecommunication terminal (e.g., a public telephone) disposed in every place provided with a power control program so that the public telecommunication terminal itself can turn on/off the power supplied thereto in an automatic way. The apparatus includes: a power control unit supplying holding power and operating power; a central control unit operated with the operating power supplied from the power control unit to thereby control a public communication function and for storing the information set on a power control program with which the power control unit is turned on or off; and an auxiliary control unit operated with the holding power supplied from the power control unit and for downloading the information set on the power control program stored in the central control unit with which the power control unit is turned on or off, wherein the auxiliary control unit compares current time with starting time among the information set in the power control program and if the current time corresponds to the starting time, turns the power control unit on such that the operating power is supplied to the central control unit; the central control unit controls the power control unit if the current time corresponds to ending time among the information set on the power control program such that the power control unit is in a standby state and at the same time, completes the operation itself; and the power control unit is turned on under the control of the auxiliary control unit to thereby supply the operating power to the central control unit or is turned off under the control of the central control unit to thereby cut off the supply of the operating power to the central control unit such that the operation of the central control unit is completed.

8 Claims, 4 Drawing Sheets

POWER CONTROL APPARATUS OF PUBLIC TELECOMMUNICATION TERMINAL

BACKGROUND OF THE INVENTION

1. Field of the Invention

The present invention relates to a power control apparatus of a public telecommunication terminal, and more particularly, to a power control apparatus of a public telecommunication terminal which makes the public telecommunication terminal (e.g., a public telephone) disposed in every place provided with a power control program so that the public telecommunication terminal itself can turn on/off the power supplied thereto in an automatic way.

In addition, the present invention relates to a power control apparatus of a public telecommunication terminal which enables a power control program embedded therein to be updated by a remote server in a remote place.

2. Background of the Related Art

With drastic change and development of information communication, there is provided an advanced communication network on which a high speed Internet is carried out, and in correspondence thereto, in recent years many pieces of equipment with various kinds of functions have been developed and proposed.

Among them, a multimedia public telecommunication terminal having various functions as a telephone, a facsimile, a video communication, Internet and the like has emerged. In addition to the function as a public telephone, the multimedia public telecommunication terminal is capable of having functions of implementing video communication and sending documents such as by facsimile. Moreover, it can realize the internal connection, the transmission of electronic mail and the supply of all kinds of contents, like computer communication. Therefore, a user can be provided with the information he or she desires in an effective way from the multimedia public telecommunication terminal.

When compared to a conventionally used ordinary public telephone, however, the multimedia public telecommunication terminal is operated with relatively high power consumption and is not capable of preventing the life of all kinds of parts (e.g., a crystal liquid display) from being shortened due to the continuous operation with the result that the reliability of the product unavoidably deteriorates.

To solve this problem, the supply of electric power to the public telecommunication terminal with the multimedia functions is cut off during a predetermined period of time (for example, when the use rate is very low or after business is closed or overnight).

However, the known manner of controlling the power in the public telecommunication terminal has some disadvantages as mentioned below.

In order to cut off the supply of power or release the cut-off state of the power supply in the public telecommunication terminal, a person should visit all of the public telecommunication terminals he supervises in every place, thereby making it difficult to supervise each of the public telecommunication terminals in an effective fashion.

Moreover, the known power control procedures require much time and personal labor, which causes additional expenses.

SUMMARY OF THE INVENTION

Accordingly, the present invention is directed to an electric power control apparatus for a public telecommunication terminal that substantially obviates one or more problems due to limitations and disadvantages of the known systems.

An object of the present invention is to provide a power control apparatus for a public telecommunication terminal in which the public telecommunication terminal is provided with a power control program so that the public telecommunication terminal itself can turn the power supplied thereto on or off in an automatic way at a time set by the power control program.

Another object of the present invention is to provide a power control apparatus for a public telecommunication terminal which enables a power control program that is embedded in the public telecommunication terminal to be updated by a remote server in a remote place.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a power control apparatus for a public telecommunication terminal. The apparatus includes a power control unit supplying holding power and operating power; a central control unit operated with the operating power supplied from the power control unit to thereby control a public communication function and for storing the information set on a power control program with which the power control unit is turned on or off; and an auxiliary control unit operated with the holding power supplied from the power control unit and for downloading the information set on the power control program stored in the central control unit with which the power control unit is turned on or off, wherein the auxiliary control unit compares the current time with a starting time among the information set in the power control program and if the current time corresponds to the starting time, turns the power control unit on such that the operating power is supplied to the central control unit; the central control unit controls the power control unit if the current time corresponds to an ending time among the information set on the power control program such that the power control unit is in a standby state and at the same time, completes the operation itself; and the power control unit is turned on under the control of the auxiliary control unit to thereby supply the operating power to the central control unit or is turned off under the control of the central control unit to thereby cut off the supply of the operating power to the central control unit such that the operation of the central control unit is completed.

According to one aspect of the present invention, desirably, the power control unit is turned on under the control of the auxiliary control unit to thereby supply the operating power to the central control unit and at the same time to transmit an operating power output checking signal to the auxiliary control unit, and the auxiliary control unit makes the power control unit repeatedly turn on until the operating power output checking signal is received from the power control unit.

According to another aspect of the present invention, preferably, the auxiliary control unit determines whether the power control unit is being turned on or off after the current time passes through the ending time, and if it is determined that the power control unit is being turned on after the current time has passed through the ending time, the auxiliary control unit makes the power control unit repeatedly turn off until the power control unit is turned off.

According to a further aspect of the present invention, the auxiliary control unit downloads the information set on the power control program stored in the central control unit at the time when the central control unit is being turned on with the operating power supplied from the power control unit.

According to a still further aspect of the present invention, preferably, the apparatus includes a remote server capable of communicating with the public telecommunication terminal in a remote lace, a modem installed in the public telecommunication terminal, for interfacing the communications between the remote server and the public telecommunication terminal, and a communication network connecting the remote server and the public telecommunication terminal in such a manner as to be able to communicate with each other, whereby the central control unit downloads the information set on the power control program from the remote server and updates the information at the time of being turned on with the operating power supplied from the power control unit.

According to another aspect of the present invention, preferably, the power control unit controls the supply of the operating power to the central control unit and the modem according to power on/off control signals from the auxiliary control unit.

According to yet another aspect of the present invention, preferably, the central control unit comprises an interface module with which the information set on the power control program is inputted by a user and updates the set information with the information on the power control program newly inputted through the interface module.

According to a further aspect of the present invention, preferably, the central control unit transmits periodically the updated information on the power control program to the remote server.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention with reference to the accompanying drawings, in which like numbers indicate the same or similar elements even if they are indicated on different figures. In the following description, also, while many specific details such as components of a predetermined circuit will be described with reference to a few specific embodiments, the description is illustrative of the invention and is not to be construed as limiting the invention. Various modifications may occur to those skilled in the art without departing from the true spirit and scope of the invention. And, an explanation of the functions and constructions related to the present invention well known to those skilled in the art will be excluded in this detailed description for the sake of brevity.

Figure 1:
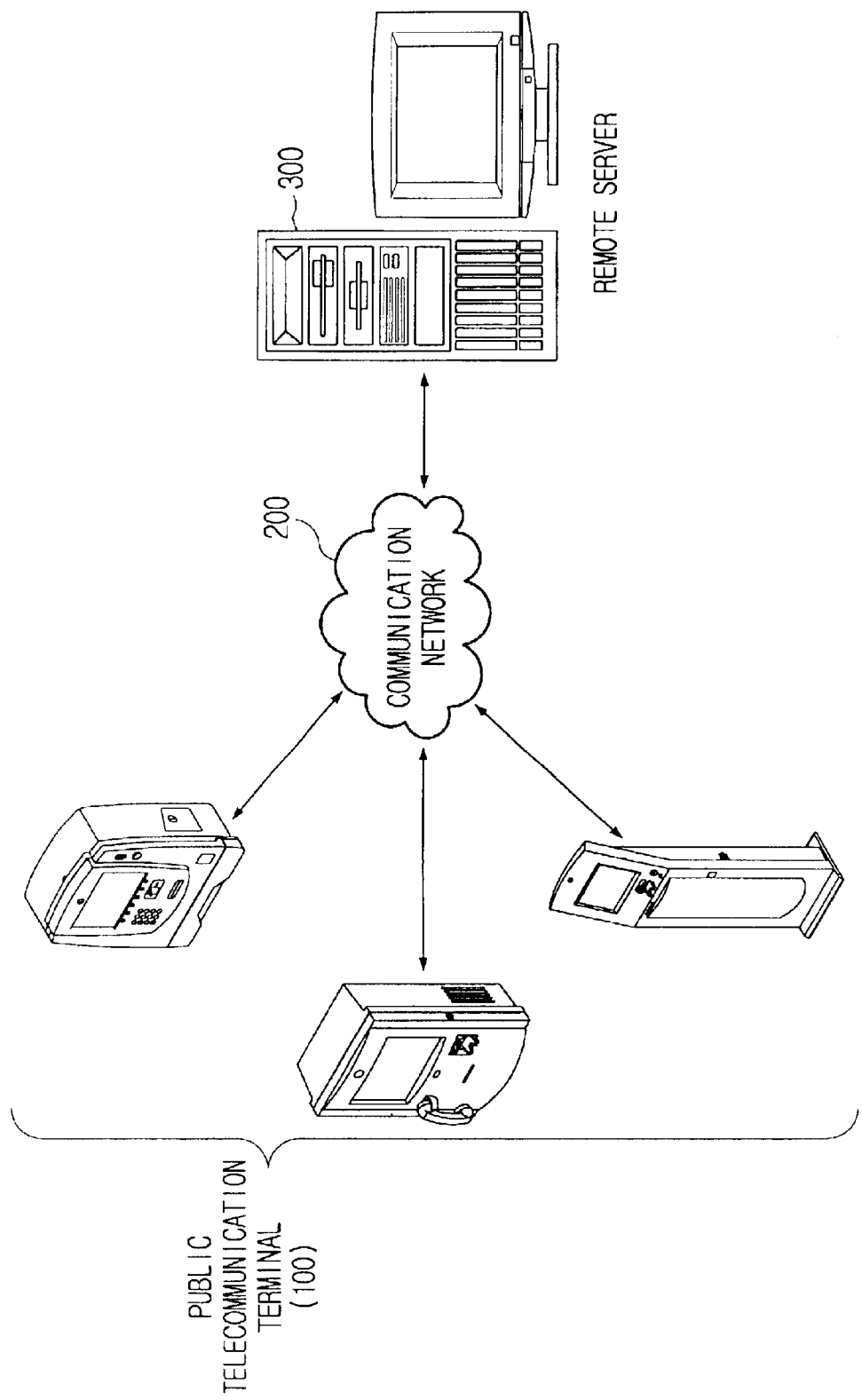
FIG. 1 is an exemplary view of a configuration of a public telecommunication terminal and a remote server, as embodied in the present invention.

Referring first to FIG. 1, a plurality of public telecommunication terminals 100, which are installed in every place, are connected to a remote server 300 in a remote place via a communication network (or an Internet network) 200. That is, each of the public telecommunication terminals 100 is able to update the information set on a power control program through the communication network 200 and transmits the updated information on the power control program to the remote server 300 in the remote place via the communication network 200.

Figure 2:
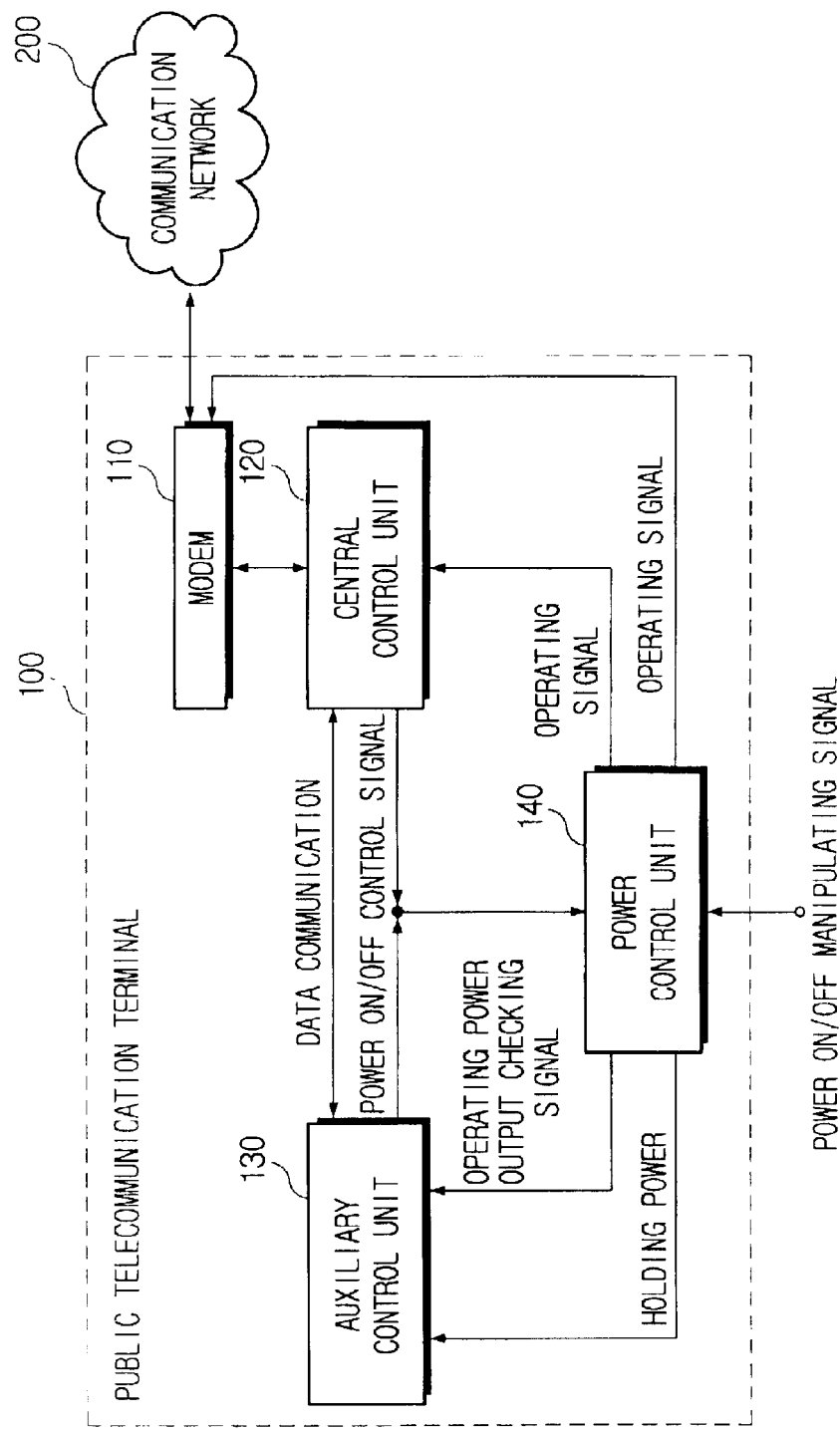
FIG. 2 is a schematic block diagram of a portion of the public telecommunication terminal in FIG. 1.

Referring now to FIG. 2 showing a schematic configuration of the public telecommunication terminal 100, a modem 110 serves to interface communications between the public telecommunication terminal 100 and the remote server 300 through the communication network 200.

A central control unit 120 stores all kinds of programs, including a ROM BIOS and an operating system such that it controls the overall operations of the public telecommunication terminal 100, and it especially stores set information (current time, turn-on time, turn-off time and so on) such that it controls the turn-on or turn-off of the public telecommunication terminal 100. In this case, the central control unit 120 is provided with a timer (a real time clock (RTC) and so on). Also, the central control unit 120 communicates data with an auxiliary control unit 130 and transmits the set information to the auxiliary control unit 130. And, the central control unit 120 downloads and stores information newly set from the remote server 300, if necessary and transmits the updated set information to the remote server 300 such that the remote server 300 can recognize the updated set information. On the other hand, the central control unit 120 is provided with an interface module with which the set information is inputted by a user such that the set information newly inputted through the interface module is updated.

The auxiliary control unit 130 is supplied with holding power from a power control unit 140 as will be discussed hereinafter such that it can be in a standby state or in an operating state. Also, the auxiliary control unit 130 downloads and stores the set information from the central control unit 120 and outputs power on/off control (trigger) signals for turning on/off the power control unit 140.

The power control unit 140 is controlled in such a manner as to be turned on or off according to the power on/off control signals from the outside and supplies the holding power to the auxiliary control unit 130. According to the power on/off control signals outputted from the auxiliary control unit 130, the power control unit 140 supplies operating power to the central control unit 120 and the modem 110, and outputs an operating power output checking signal to the auxiliary control unit 130, such that it is checked whether the operating power has been supplied to the central control unit 120 and the modem 110.

Figure 3:
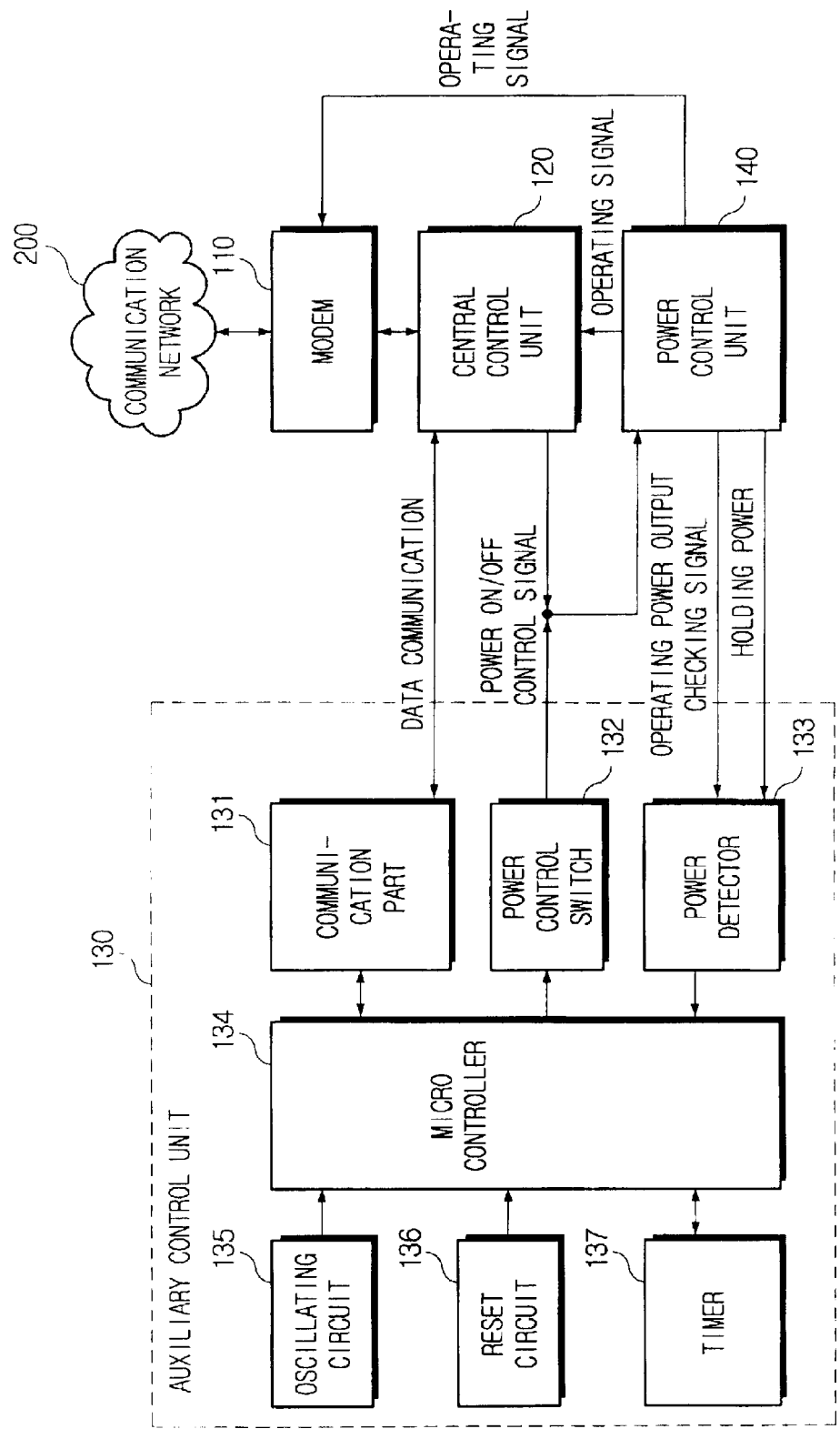
FIG. 3 is a detailed block diagram of a configuration of an auxiliary control unit in FIG. 2.

Referring to FIG. 3 showing the detailed block diagram of the auxiliary control unit, on the other hand, a communication part 131 downloads the set information in the central control unit 120 through communication with the central control unit 120.

A power control switch 132 outputs the power on/off control signals to the control unit 140 for turning the power control unit 140 on or off.

A power detector 133 receives the operating power output checking signal transmitted from the power control unit 140 and detects whether the operating power is normally supplied to the central control unit 120.

A microcontroller 134 stores the set information received through the communication part 131, controls the power control switch 132 such that the power control unit 140 is turned or off, and in accordance with the detected result of the power detector 133, outputs control signals (for example, a power-on control signal and a power-off control signal) for turning on or off the power control unit 140.

An oscillating circuit 135 generates a clock signal of various frequencies and supplies it to the microcontroller 134 such that the microcontroller 134 begins to operate.

A reset circuit 136 forces the microcontroller 134 to be reset, in case where the microcontroller 134 operates abnormally.

A timer 137 outputs time information to the microcontroller 134. At this time, the timer 137 is used with a real time clock.

Figure 4:
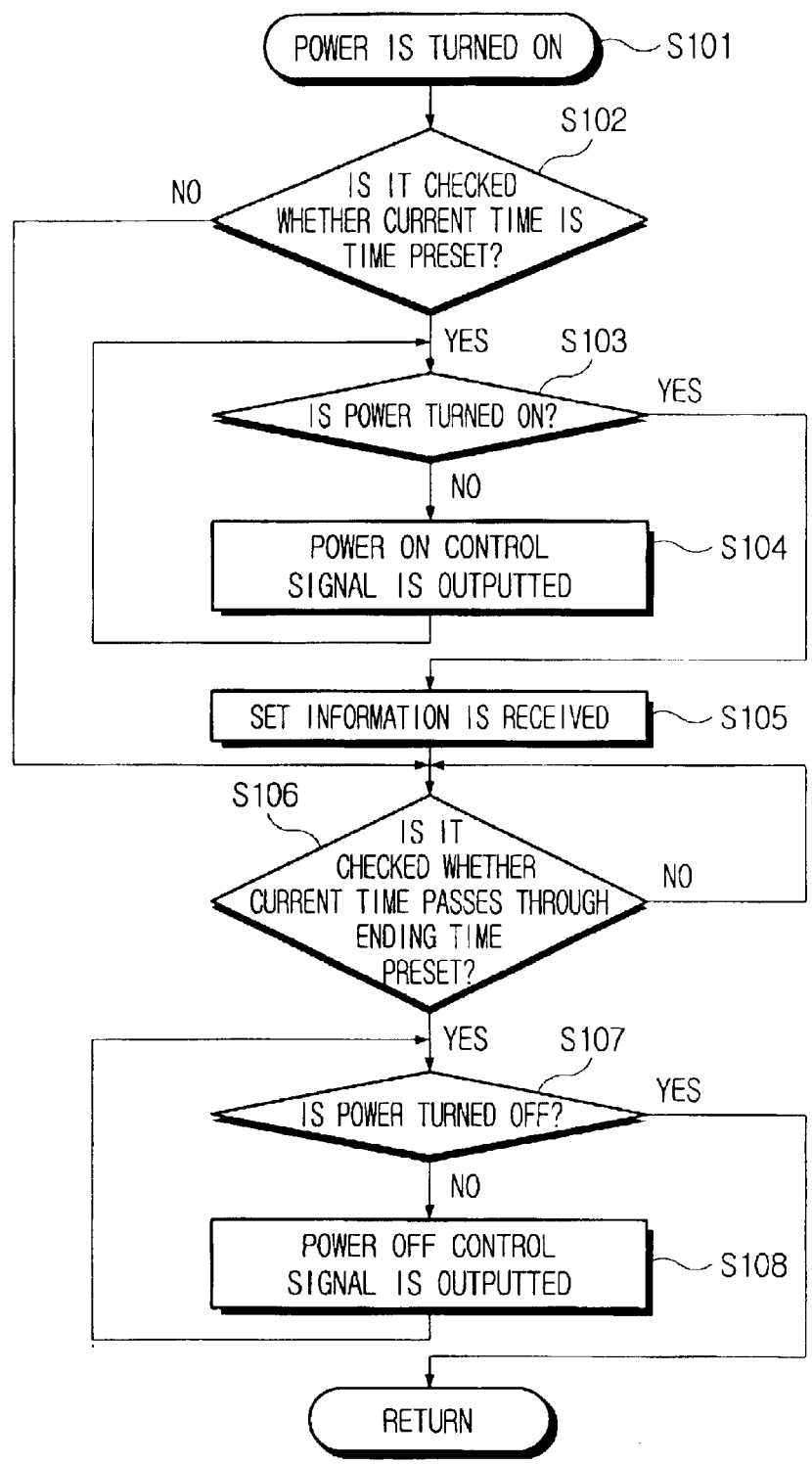
FIG. 4 is a flow chart of the operating procedure of the power control apparatus of the public telecommunication terminal according to the present invention.

An explanation of the operating procedure of the power control apparatus according to the present invention will be described with reference to FIG. 4.

If power is initially applied to the public telecommunication terminal 100 by a user at step S101, the power on/off control signal is supplied to the power control unit 140. Thereby, the power control unit 140 is changed to a standby state and supplies the holding power to the auxiliary control unit 130. The microcomputer 134 in the auxiliary control unit 130 compares the starting time set previously with the current time information outputted from the timer 137 and checks whether the current time corresponds to the set starting time at step S102. In this case, if the current time does not correspond to the set starting time, the microcontroller 134 is held in the standby state until the current time corresponds to the starting time.

If it is determined that the current time outputted from the timer 137 corresponds to the set starting time at the step S102, the microcontroller 134 checks whether the power control unit 140 is being turned on at step S103. In this case, the power control unit 140 is kept in the standby state by the power on/off control signal, such that the microcontroller 134 checks that the power control unit 140 is not turned on.

If it is determined at the step S103 that the power control unit 140 is not turned on, the microcontroller 134 in the auxiliary control unit 130 controls the power control switch 132 such that the power on control signal is outputted by the power control switch 132 to the power control unit 140 at step 104. After that, the operating flow is returned to the step S103.

The power control unit 140, which receives the power on control signal from the power control switch 132, is changed to the power on state and thereby, the operating power produced from the power control unit 140 is supplied to the central control unit 120 and the modem 110, respectively. Thus, the central control unit 120 and the modem 110 are ready to operate, such that the public telecommunication terminal 100 operates normally.

Additionally, the power control unit 140 transmits to the auxiliary control unit 130 the operating power output checking signal that checks whether the operating power is supplied to the central control unit 120 and the modem 110. Thereby, the auxiliary control unit 130 checks whether the central control unit 120 and the modem 110 are being turned on at the S103, and if it is checked that the central control unit 120 and the modem 110 have been turned on, it receives the set information (on/off time information, current time information and so on) in the central control unit 120 through the communication part 131.

In this case, the set information in the central control unit 120 has functions of being set by the central control unit 120 therein and being set by the remote server 300 in a remote place. Also, the central control unit 120 informs the remote server 300 of the set information through the modem 110 and the communication network 200, such that the set information is managed by the remote server 300.

On the other hand, if it is determined that the current time does not correspond to the starting time set at the step S102 or after the set information is received at the step S105, the microcomputer 134 in the auxiliary control unit 130 checks whether the current time passes through the ending time in the set time information at step S106. If it is checked that the current time has passed through the ending time at the step S106, the microcomputer 134 itself cuts off the supply of power and completes the operation. At the same time, the microcomputer 134 outputs the power off control signal with a result that the power control unit 140 is changed to the standby state. Thereby, the power control unit 140 cuts off the supply of power to the central control unit 120 and the modem 110 and outputs the operating power output checking signal at a disable state to the auxiliary control unit 130. Next, the auxiliary control unit 130 checks with the operating power output checking signal at the disable state outputted from the power control unit 140 whether the power control unit 140 is turned off at step S107. In this case, if the power control unit 140 is not changed to the standby state even in the state where the current time has passed through the ending time, the microcontroller 134 in the auxiliary control unit 130 controls the power control switch 132 such that the power off control signal is outputted from the power control switch 132. Thereby, the power control unit 140 is forced to be in the standby state by the power off control signal outputted from the power control switch 132.

Therefore, the power of the public telecommunication terminal is controlled by the power control program and the set information is updated from the remote server such that the power can be controlled in a remote place.

As clearly appreciated from the foregoing, a power control apparatus of a public telecommunication terminal according to the present invention controls the power of the public telecommunication terminal itself by a power control program such that a user does not need to visit the place where the public telecommunication terminal is disposed.

In addition, set information is updated from a remote server in a remote place, which is transmitted periodically to the remote server, such that the power of the public telecommunication terminals installed in every place can be controlled at a time in the remote server in the remote place.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A power control apparatus of a public telecommunication terminal, said apparatus comprising:

a power control unit adapted for supplying holding power and operating power;

a central control unit operated with said operating power supplied from said power control unit to thereby control a public communication function and for storing an information set on a power control program by which said power control unit is turned on or off; and an auxiliary control unit operated with said holding power supplied from said power control unit and for downloading the information set on said power control program stored in said central control unit by which said power control unit is turned on or off, wherein said auxiliary control unit compares a current time with a starting time among said information set in said power control program and if said current time corresponds to said starting time, turns said power control unit on such that said operating power is supplied to said central control unit; said central control unit controls said power control unit if said current time corresponds to an ending time among said information set on said power control program such that said power control unit is in a standby state and at the same time, completes the operation itself; and said power control unit is turned on under the control of said auxiliary control unit to thereby supply said operating power to said central control unit or is turned off under the control of said central control unit to thereby cut off the supply of said operating power to said central control unit such that the operation of said central control unit is completed.

2. The power control apparatus according to claim 1, wherein said power control unit is turned on under the control of said auxiliary control unit to thereby supply said operating power to said central control unit and at the same time to transmit an operating power output checking signal to said auxiliary control unit, and said auxiliary control unit makes said power control unit repeatedly turned on until said operating power output checking signal is received from said power control unit.

3. The power control apparatus according to claim 1, wherein said auxiliary control unit determines whether said power control unit is being turned on or off after said current time passes through said ending time, and if it is determined that said power control unit is being turned on after said current time has passed through said ending time, said auxiliary control unit makes said power control unit repeatedly turned off until said power control unit is turned off.

4. The power control apparatus according to claim 1, wherein said auxiliary control unit downloads said information set on said power control program stored in said central control unit at the time when said central control unit is being turned on with said operating power supplied from said power control unit.

5. The power control apparatus according to claim 1, further comprising a remote server capable of communicating with said public telecommunication terminal in a remote place; a modem installed in said public telecommunication terminal, for interfacing the communications between said remote server and said public telecommunication terminal; and a communication network connecting said remote server and said public telecommunication terminal in such a manner as to be communicated with each other, whereby said central control unit downloads said information set on said power control program from said remote server and updates the information at the time of being turned on with said operating power supplied from said power control unit.

6. The power control apparatus according to claim 5, wherein said power control unit controls the supply of said operating power to said central control unit and said modem according to power on/off control signals from said auxiliary control unit.

7. The power control apparatus according to claim 1, wherein said central control unit further comprises an interface module with which said information set on said power control program is inputted by a user and updates said set information with the information on said power control program newly inputted through said interface module.

8. The power control apparatus according to claim 5 or 7, wherein said central control unit transmits periodically the updated information on said power control program to said remote server.

\* \* \* \* \*